United States Patent
Puppin

(10) Patent No.: US 9,047,244 B1
(45) Date of Patent: Jun. 2, 2015

(54) MULTI-SCREEN COMPUTING DEVICE APPLICATIONS

(75) Inventor: Diego Puppin, Newton, MA (US)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/610,099

(22) Filed: Sep. 11, 2012

(51) Int. Cl.
G06F 15/173 (2006.01)
G06F 15/16 (2006.01)
H04W 24/00 (2009.01)
H04L 12/58 (2006.01)

(52) U.S. Cl.
CPC ............ *G06F 15/173* (2013.01); *H04L 12/581* (2013.01)

(58) Field of Classification Search
CPC ......... H04L 67/18; H04L 67/22; H04L 67/36; H04L 51/20; H04L 51/21; H04L 51/38; H04L 12/1827; H04L 12/581; H04L 12/5895
USPC ........... 709/217, 224, 227; 455/457; 701/201, 701/208, 400, 408, 412, 418
See application file for complete search history.

(56) References Cited

U.S. PATENT DOCUMENTS

| | | | |
|---|---|---|---|
| 5,923,307 A | 7/1999 | Hogle et al. | |
| 6,317,605 B1 * | 11/2001 | Sakuma | 455/457 |
| 6,823,525 B1 | 11/2004 | Martyn | |
| 7,085,578 B2 * | 8/2006 | Barclay et al. | 455/457 |
| 7,353,034 B2 * | 4/2008 | Haney | 455/457 |
| 7,439,937 B2 | 10/2008 | Ben-Shachar et al. | |
| 7,586,877 B2 * | 9/2009 | Gits et al. | 370/331 |
| 8,018,398 B1 | 9/2011 | Harris | |
| 8,200,186 B2 * | 6/2012 | Ashley et al. | 455/404.2 |
| 8,285,245 B2 * | 10/2012 | Ashley et al. | 455/404.1 |
| 8,301,174 B2 * | 10/2012 | An | 455/457 |
| 2003/0212811 A1 | 11/2003 | Thornton et al. | |
| 2005/0102356 A1 | 5/2005 | Manion et al. | |
| 2006/0276205 A1 * | 12/2006 | Bengtsson | 455/457 |
| 2008/0096583 A1 * | 4/2008 | Karaoguz et al. | 455/457 |
| 2009/0141118 A1 * | 6/2009 | Chun | 348/14.07 |
| 2010/0122183 A1 * | 5/2010 | Babaian et al. | 715/752 |
| 2011/0015858 A1 * | 1/2011 | Takagi et al. | 701/201 |
| 2011/0217989 A1 * | 9/2011 | Fodor et al. | 455/456.1 |
| 2012/0281020 A1 * | 11/2012 | Yamamoto et al. | 345/660 |

* cited by examiner

*Primary Examiner* — David Lazaro
*Assistant Examiner* — Farzana Huq
(74) *Attorney, Agent, or Firm* — Troutman Sanders LLP; James E. Schutz; Christopher W. Glass

(57) ABSTRACT

A system, apparatus and method for executing a software program on a plurality of computing devices are disclosed. A first computing device executes a software program and displays data related to that program. A second computing device displays data related to the program and to location data regarding a physical location of the second computing device related to the first computing device. Display data can be updated based on changes in relative position and/or changes made on one of the devices.

21 Claims, 9 Drawing Sheets

_MULTI-SCREEN COMPUTING DEVICE APPLICATIONS_

TECHNICAL FIELD

This disclosure relates to computing devices and software programs that execute on such devices.

BACKGROUND

Computing devices such as mobile telephones, tablets, laptops and desktops have become widely available in recent years. These devices can be equipped with processors, memory and the capability to communicate through local and wide area networks, including the Internet. These devices can also be equipped with output devices such as displays, image-sensing devices and sound-sensing devices that allow the device user to record, display and communicate content to other computing devices and other device users.

Some computing devices, including mobile phones and tablets, are equipped with location sensing devices. Location sending devices can include global positioning system (GPS) sensors, inertial sensors, flux-gate compasses and triangulation systems based on cellular telephone signals. These devices permit a computing device to determine its absolute or relative position or orientation to varying degrees of resolution.

SUMMARY

One aspect of the embodiments taught herein includes a method for displaying data using a plurality of computing devices. The method comprises, for example, executing a software program on a first computing device of the plurality of computing devices using a processor, determining location data regarding a physical location of a second computing device of the plurality of computing devices relative to the first computing device, displaying, on a display screen of the first computing device, data based on the software program executing on the first computing device, and displaying, on a display screen of the second computing device, data based on the software program executing on the first computing device and the location data regarding the physical location of the second computing device relative to the first computing device. At least one of the first computing device or the second computing device is a mobile computing device.

Embodiments of an apparatus for displaying data using a plurality of computing devices are also taught herein. The apparatus according to one embodiment comprises a first computing device of the plurality of computing devices including a memory and a first processor. The first processor is configured to execute instructions stored in the memory to execute a software program and display, on a display screen of the first computing device, data based on the software program executing on the first computing device. The apparatus also comprises a second computing device of the plurality of computing devices including a memory and a second processor. The second processor is configured to execute instructions stored in the memory to display, on a display screen of the second computing device, data based on the software program executing on the first computing device and location data regarding a physical location of the second computing device relative to the first computing device. At least one of the first processor or the second processor is configured to determine the location data regarding the physical location of the second computing device relative to the first computing device. At least one of the first computing device or the second computing device is a mobile computing device.

Another aspect of the embodiments taught herein is a non-transitory computer readable media containing a software program for displaying data using a plurality of computing devices and having code for performing the steps of determining location data regarding a physical location of a second computing device of the plurality of computing devices relative to a first computing device of the plurality of computing devices, displaying, on a display screen of the first computing device, data based on the software program executing on the first computing device, and transmitting, to the second computing device, instructions for displaying data on a display screen of the second computing device based on the software program executing on the first computing device and the location data regarding the physical location of the second computing device relative to the first computing device.

Variations in these and other embodiments are described in additional detail hereinafter.

BRIEF DESCRIPTION OF THE DRAWINGS

The various features, advantages and other uses of the present apparatus will become more apparent by referring to the following detailed description and drawing in which.

DETAILED DESCRIPTION

Computing devices can execute software programs stored in memory to operate on data. Operations on data can include, for example, creating, reading, storing, calculating, transforming, receiving, transmitting or displaying data on a display screen. Two or more computing devices can also be in communication and exchange data via a variety of networks. A computing device can also have a location-sensing device that can, for example, provide a computing station with data representing changes in the computing device's location and orientation with a high degree of resolution. Embodiments taught herein disclose combining the ability of two or more computing devices to execute a software program, communicate data and display data while using location-sensing devices to coordinate the display of data and execution of software programs between the two or more computing devices.

Figure 1:
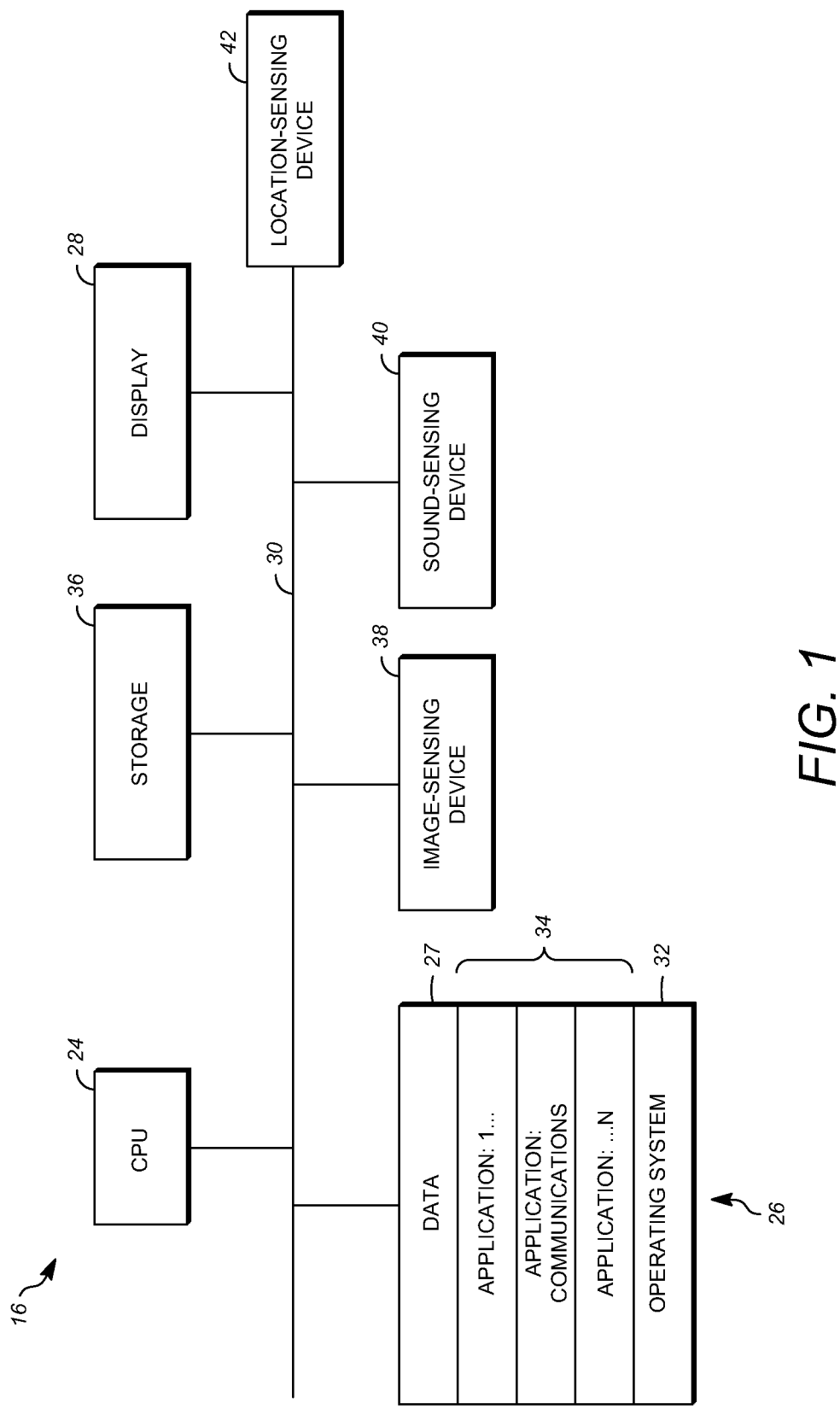
FIG. 1 is a block diagram showing an example of a computing device.

FIG. 1 is a block diagram of an example of a computing device 16. Computing device 16 can be in the form of a computing system including multiple computing devices, or in the form of a single computing device, for example, a mobile phone, a tablet computer, a laptop computer, a notebook computer, a desktop computer, and the like.

A CPU 24 in the computing device 16 can be a conventional central processing unit. Alternatively, CPU 24 can be any other type of device, or multiple devices, capable of manipulating or processing information now-existing or hereafter developed. Although the disclosed embodiments can be practiced with a single processor as shown, e.g. CPU 24, advantages in speed and efficiency can be achieved using more than one processor.

A memory 26 in computing device 16 can be a random access memory device (RAM). Any other suitable type of storage device can be used as memory 26. Memory 26 can include code and data 27 that is accessed by CPU 24 using a bus 30. Memory 26 can further include an operating system 32 and application programs 34, application programs 34 including programs that permit CPU 24 to perform the methods described here. For example, application programs 34 can include applications 1 through N, which further include a communications application that performs the methods described here. Computing device 16 can also include a secondary storage 36, which can, for example, be a memory card used with a mobile computing device 16. Because the video communication sessions may contain a significant amount of information, they can be stored in whole or in part in secondary storage 36 and loaded into memory 26 as needed for processing.

Computing device 16 can also include one or more output devices, such as a display 28, which can be a touch sensitive display that combines a display screen with a touch sensitive element that is operable to sense touch inputs. Display 28 can be coupled to CPU 24 via bus 30. Other output devices that permit a user to program or otherwise use computing device 16 can be provided in addition to or as an alternative to display 28. When the output device is or includes a display, the display can be implemented in various ways, including by a liquid crystal display (LCD) screen, a cathode-ray tube (CRT) or a light emitting diode (LED) display screen, such as an OLED display screen.

Computing device 16 can also include or be in communication with an image-sensing device 38, for example a camera, or any other image-sensing device 38 now existing or hereafter developed that can sense the image of a device user operating computing device 16. Image-sensing device 38 can be positioned such that it is directed toward a device user that is operating computing device 16. For example, the position and optical axis of image-sensing device 38 can be configured such that the field of vision includes an area that is directly adjacent to display 28 and from which display 28 is visible. Image-sensing device 38 can be configured to receive images, for example, of the face of a device user while the device user is operating computing device 16.

Computing device 16 can also include or be in communication with a sound-sensing device 40, for example a microphone or any other sound-sensing device now existing or hereafter developed that can sense the sounds made by the device user operating computing device 16. Sound-sensing device 40 can be positioned such that it is directed toward the device user operating computing device 16. Sound-sensing device 40 can be configured to receive sounds, for example, speech or other utterances made by the device user while the device user operates computing device 16.

Computing device 16 can also include or be in communication with a location-sensing device 42, for example a global positioning system (GPS) sensor, a 3D inertial sensor, a near field proximity sensor or a triangulation system based on cellular telephone signals or any other location-sensing device now existing or hereafter developed that can sense the location and orientation of computing device 16. Location-sensing device 42 can supply computing device 16 with location data regarding the physical location or change in physical location of computing device 16. Location-sensing device 42 permits a computing device to determine its absolute or relative position or orientation to varying degrees of resolution. Location-sensing device 42 can be configured to detect acceleration in three dimensions, for example, and thereby calculate changes in location or orientation of computing device 16.

Although FIG. 1 depicts CPU 24 and memory 26 of computing device 16 as being integrated into a single unit, other configurations can be utilized. The operations of CPU 24 can be distributed across multiple machines (each machine having one or more of processors), which can be coupled directly or across a local area or other network. Memory 26 can be distributed across multiple machines such as network-based memory or memory in multiple machines performing the operations of computing device 16. Although depicted here as a single bus, bus 30 of computing device 16 can be composed of multiple buses. Further, secondary storage 36 can be directly coupled to the other components of computing device 16 or can be accessed via a network and can comprise a single integrated unit such as a memory card or multiple units such as multiple memory cards. Computing device 16 can thus be implemented in a wide variety of configurations.

Figure 2:
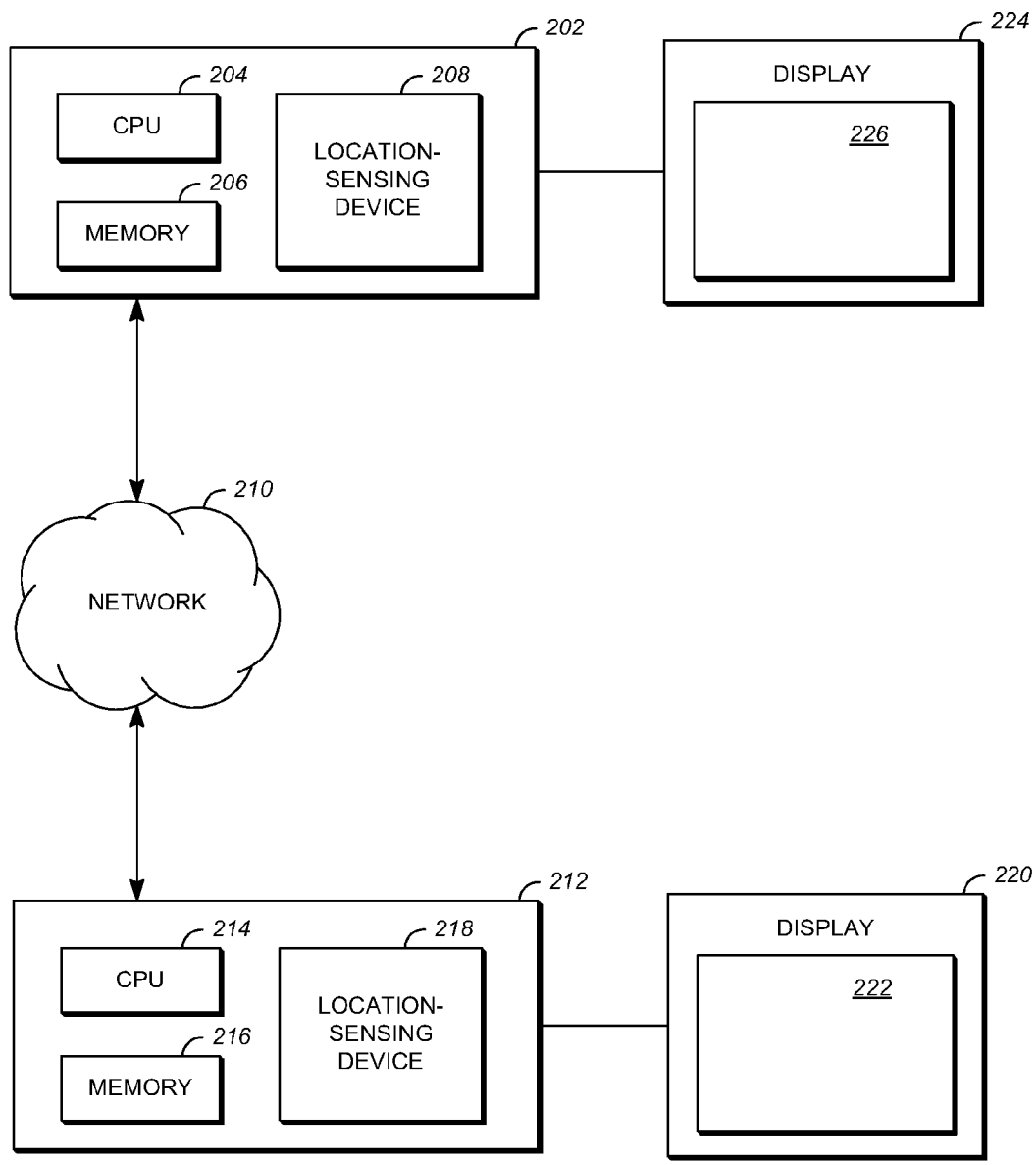
FIG. 2 is a block diagram showing two computing devices according to an embodiment.

FIG. 2 is a block diagram of a computing device system 200 according to an embodiment. An exemplary computing device 202 can be, for example, a computing device as disclosed in FIG. 1, having an internal configuration of hardware including a processor such as a central processing unit (CPU) 204, a memory 206 and a location-sensing device 208. CPU 204 can be a controller for controlling the operations of computing device 202. CPU 204 is connected to memory 206 and location-sensing device 208 by, for example, a memory bus. Memory 206 can be read only memory (ROM), RAM or any other suitable memory device. Memory 206 can store data and program instructions that are used by CPU 204. Location-sensing device 208 can detect the absolute physical location of computing device 202 or the change in physical location of computing device 202. Other suitable implementations of computing device 202 are possible. For example, the processing of computing device 202 can be distributed among multiple devices.

A display screen 224 configured to display data 226 can be connected to computing device 202. Display screen 224 can be implemented in various ways, including by a LCD display, CRT or LED display. Display screen 224 can be operative to display data 226 under control of a software program stored in memory 206 and executed on CPU 204.

A network 210 connects computing device 202 and a computing device 212 for transmission of data between computing devices 202, 212. Data, as used herein, can be defined as information or signals which may be input, output, transmitted, received, stored, read, displayed or otherwise operated upon by a computing device. Data can be in digital form and can originate at computing device 202 and be transmitted to and received by computing device 212 or data can originate at computing device 212 and be transmitted to and received by computing device 202 via network 210. Network 210 can be, for example, a local area network (LAN). Network 210 can also be Bluetooth®, near field communications (NFC), wide area network (WAN), virtual private network (VPN), cellular telephone network or any other means of transferring data to and from computing device 202 and to and from computing device 212.

Computing device 212, in one example, can be a computer having an internal configuration of hardware including a processor such as a CPU 214, a memory 216 and a location-sensing device 218 as disclosed in FIG. 1. CPU 214 can be a controller for controlling the operations of computing device 212. CPU 214 is connected to memory 216 and location-sensing device 218 by, for example, a memory bus. Memory 216 can be ROM, RAM or any other suitable memory device. Memory 216 can store data and program instructions that are used by CPU 214. Location-sensing device 218 can detect the absolute physical location of computing device 212 or the change in physical location of computing device 212. Other suitable implementations of computing device 212 are possible. For example, the processing of computing device 212 can be distributed among multiple devices.

A display screen 220 configured to display data 222 can be connected to computing device 212. Display screen 220 can be implemented in various ways, including by a LCD display, a CRT or a LED display. Display screen 220 can be operative to display data 222 under control of a software program stored in memory 216 and executed on CPU 214.

Figure 3:
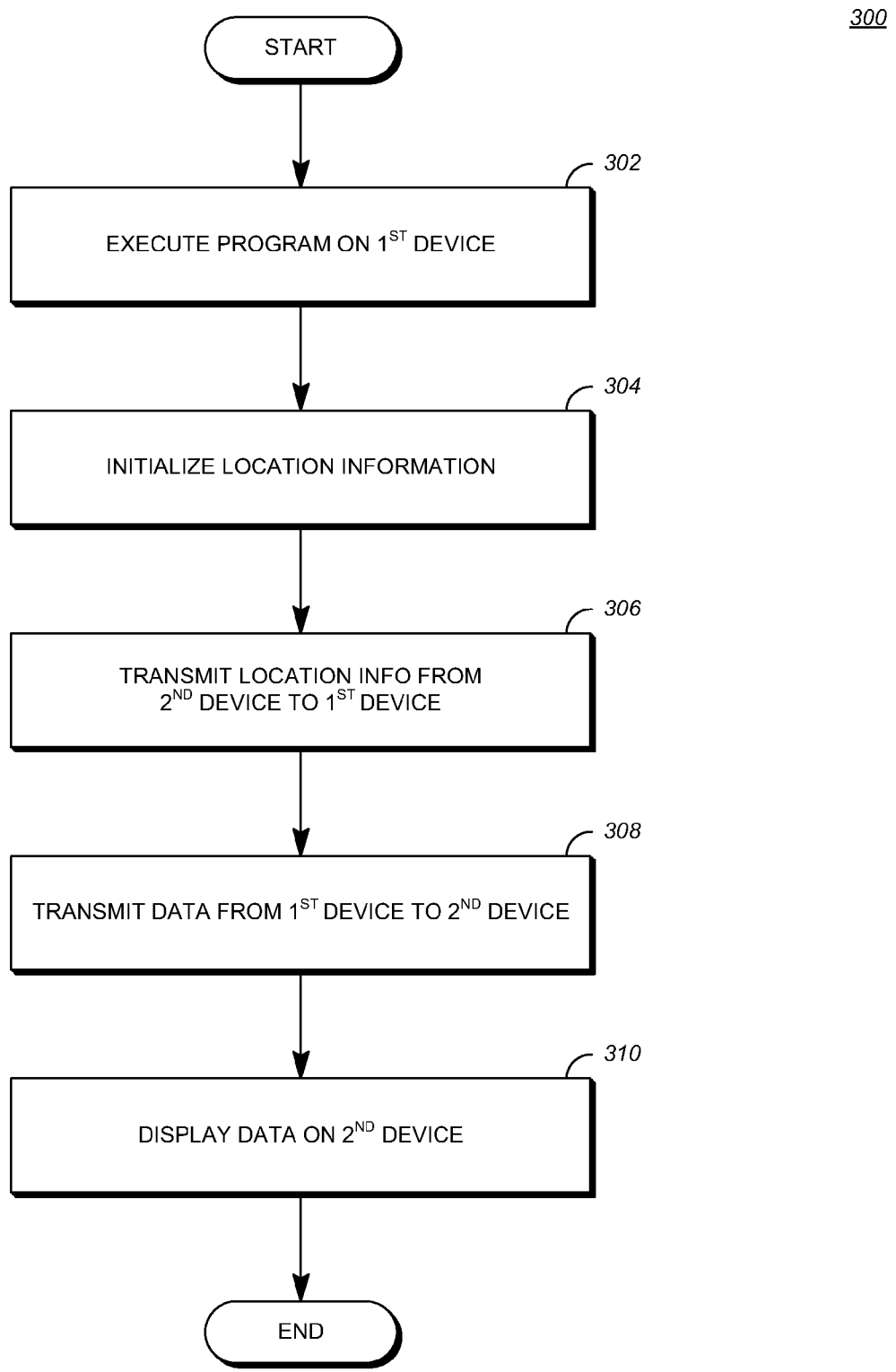
FIG. 3 is a flowchart showing a method of operation for coordinating the activities of multiple computing devices having display screens.

FIG. 3 is a flowchart showing a method of operation 300 for coordinating the activities of multiple computing devices having display screens. For simplicity of explanation, method of operation 300 is depicted and described as a series of steps. However, steps in accordance with this disclosure can occur in various orders and/or concurrently. For example, while in FIG. 3, a software program is executed on the first device at step 302 before locations are initialized at step 304, it shall be appreciated that the steps can be performed in other orders and remain within the scope of this disclosure. In an implementation, for example, the locations may be initialized before or concurrently with the execution of the software program on the first computing device. Additionally, steps in accordance with this disclosure may occur with other steps not presented and described herein. Furthermore, not all illustrated steps may be required to implement a method in accordance with the disclosed subject matter.

At step 302, a software program is executed on a first computing device, such as computing device 202. Executing a software program refers to loading machine-readable instructions into memory of a computing device, where they can be accessed by a CPU and thereby cause the computing device to perform operations on data that can also be loaded into the memory. Loading instructions or data into memory refers to reading the instructions or data from a source such as a memory, a network or a storage device such as a disk drive or removable media such as a CompactFlash (CF) card, Secure Digital (SD) card, or the like, and storing the instructions or data at memory locations.

The software program can be an application that has, for example, data that represents an image that is larger than can be conveniently displayed on the display screen of a single display device, for example a map. An example of a software program that displays data of this type is given in relation to FIG. 4, below. The software program in certain embodiments may also be an application that displays data on its display screen wherein the data depends upon, for example, information received from a second computing device, such as computing device 212, regarding the relative locations of the two computing devices. An example of this type of software program is shown in relation to FIGS. 5 and 6, below.

At step 304, the relative locations of the two or more computing devices are initialized. The computing devices can be, for example, tablet or other computing devices such as mobile phones that can be placed horizontally on a planar surface in a predetermined physical relationship. For example, tablet computers may be arranged on a tabletop in a pattern so as to be adjacent. One or more of the computing devices can display a diagram that indicates the predetermined physical arrangement. Alternatively, the computing devices in certain embodiments are physically arranged and a schematic diagram on one or more of the computing devices may be arranged to match the arrangement of the computing devices.

When the physical arrangement of the computing devices matches the diagrammatic representation of the computing devices, the agreement between the physical relationship of the computing devices and the predetermined relationship can be indicated. As used herein the term "indicate" means to designate, show, denote, signal, specify or otherwise indicate in any manner whatsoever. The agreement between the physical relationship and the predetermined relationship can be indicated by interacting with a user interface, for example a touch screen on one of the computing devices. The agreement can also be indicated by "bumping" the devices for example, where the computing devices are "bumped" or touched together to create an event that can be mutually detected by the location-sensing devices, such as location-sensing devices 208, 218, in the computing devices. The computing devices note their physical location using location-sensing devices at the time the initial arrangement is indicated to permit the computing devices to update their relative physical locations as they are moved from the initial arrangement. This is shown in more detail in relation to FIG. 4, below.

At step 306, at least one computing device, which can have a configuration such as computing device 212 and is called second computing device, communicates its location information to another computing device, which can have a configuration such as computing device 202 and is called first computing device. The computing devices can be operative to be in communication via a network, such as network 210. When the physical arrangement of the computing devices is made known to at least one of the computing devices, the physical relationship can be communicated to all of the computing devices in the arrangement. Since the computing devices can be equipped with location-sensing devices, changes in the location of one or more of the computing devices can be communicated to other computing devices in the arrangement, thereby permitting one or more of the computing devices to update their displayed data to represent the change in location. As one or more of the computing devices change location, the change in location can be communicated to at least one other computing device in the arrangement.

At step 308, first computing device can transmit data to at least second computing device. The transmitted data can be received by a software program executing on the second computing device, for example. The transmitted data can be display data related to software programs executing on the computing devices that includes information regarding the relative locations of the computing devices. Alternatively, the second computing device can receive data from a first computing device and process the data by combining it with information regarding its relative location to the first computing device. In either case, the second computing device can receive or form display data to be displayed on its display device, such as display device 220. Examples of display data that include information regarding the relative locations of the computing devices is given in relation to FIGS. 4, 5, 6 and 7, below. At step 310, the received display data can be displayed on the display screen, such as display 220, of the second computing device.

Figure 4:
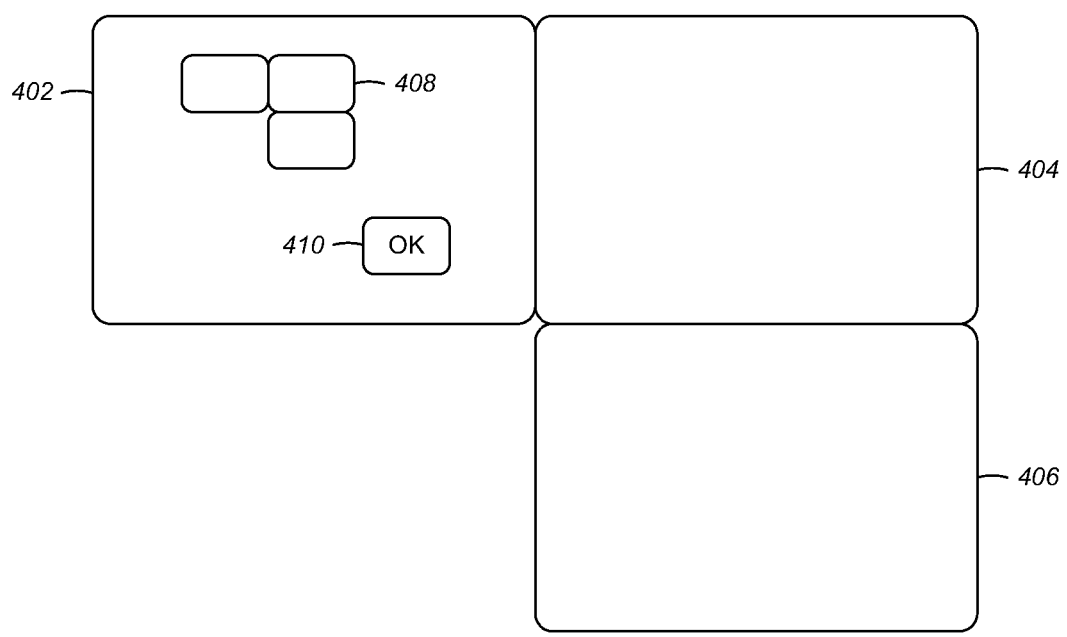
FIG. 4 is a diagram of a multi-screen application according to an embodiment showing initialization.

FIG. 4 is a diagram of a multi-screen application 400 according to an embodiment showing initialization. Multi-screen application 400 shows three computing devices 402, 404 and 406. Computing devices 402, 404 and 406 can be, for example, tablet or other computing devices having a configuration such as shown in FIG. 1 and coupled together by a network, such as network 210 in FIG. 2. Computing devices 402, 404 and 406 can be arranged in a physical relationship to match a diagram 408 of three computing devices displayed on first computing device 402. When the physical arrangement of computing devices 402, 404 and 406 matches diagram 408, a user can touch an "OK" button 410 on first computing device 402, for example. Computing devices 402, 404 and 406 can then note their initial locations using their location-sensing devices. Then, as computing devices 402, 404 and 406 are moved relative to each other, their new locations can be determined by their location-sensing devices and transmitted to the other computing devices.

Figure 5:
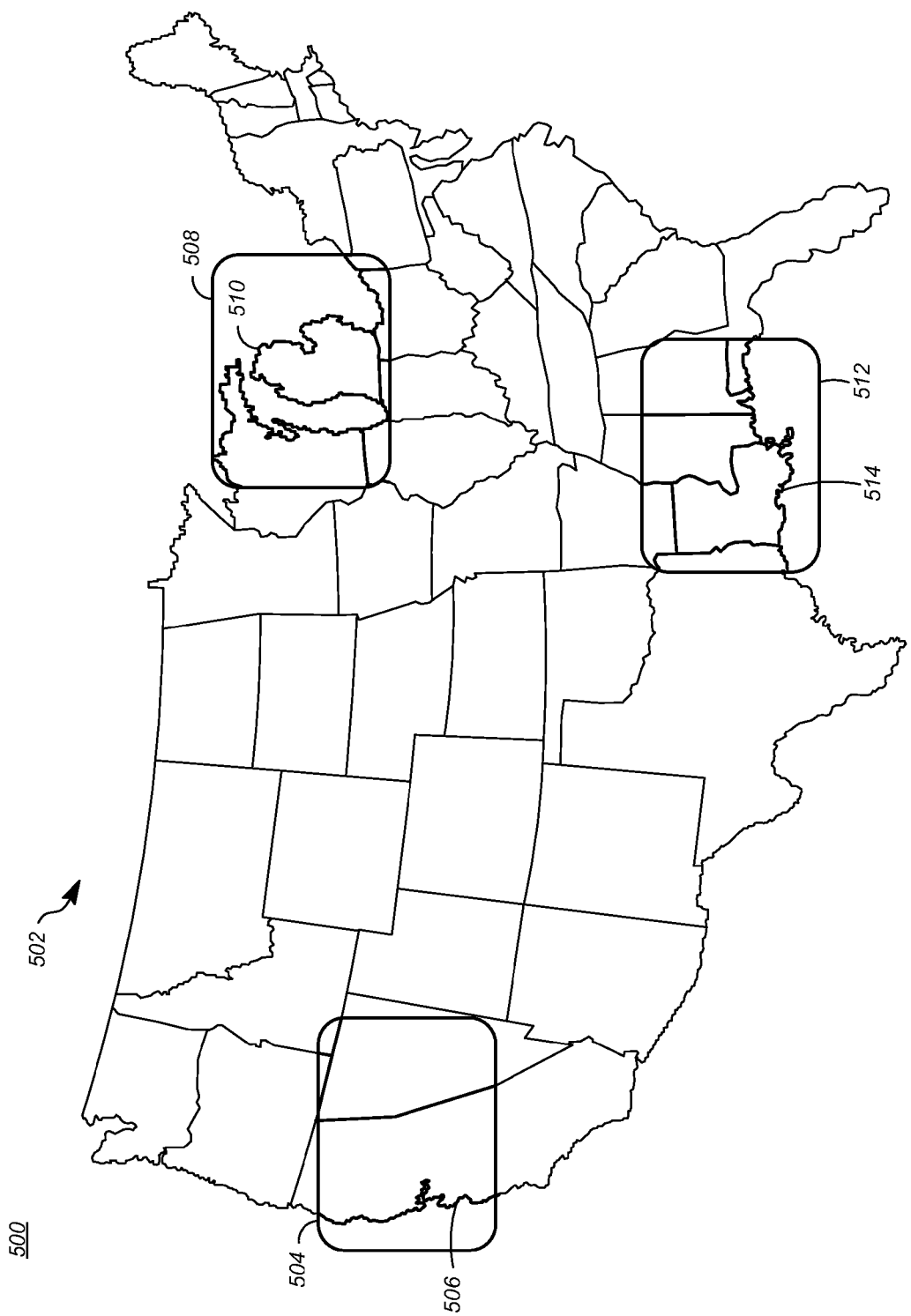
FIG. 5 is a diagram of a multi-screen application according to an embodiment showing a mapping application.

FIG. 5 is a diagram of a multi-screen application 500 according to an embodiment showing a mapping application. Multi-screen application 500 shows a mapping application including a virtual map 502. Virtual map 502 is referred to as virtual since it exists as data in the memory of one or more of the computing devices 504, 508 and is not displayed in its entirety on any display screen. A first computing device 504, which can be a tablet or other computing device having a configuration such as shown in FIG. 1, displays a first portion 506 of map 502 on its display screen, such as display 28. First computing device 504 can be arranged in a relationship with a second computing device 508 in a manner such as shown in FIG. 2.

First computing device 504 can transmit all or a portion of a database, for example map 502 data, to a second computing device 508. Second computing device 508, which can be a tablet or other computing device having a configuration such as shown in FIG. 1, displays a second portion 508 of map 502 on its display screen, such as display 28, based on data transmitted from first computing device 504 and location data sensed by its own location-sensing device. Portion 510 of map 502 displayed by second computing device 508 on its display screen depends upon the spatial relationship between first computing device 504 and second computing device 508.

Second computing device 508 can move to a new location 512, for example. Second computing device 508 at location 512 can detect the change in relative location to first device 504 with its location-sensing device, such as location-sensing device 42. Second computing device 508 at location 512 can either access data in its memory, such as memory 26, or it can send a request to first computing device 504 to send additional data. Second computing device 508 at location 512 can then display a third portion 514 of map 502 on its display screen. User interface controls at either of the computing devices 504, 508, can, for example, change the scale of map 502, which can change the display data displayed at one or more of the computing devices. For example, user interface controls on first computing device 504 can be used to change the scale or relative location of map 502. These changes can be transmitted to second computing device 508, whereupon second computing device 508 can update its data displayed on its display screen.

Figure 6:
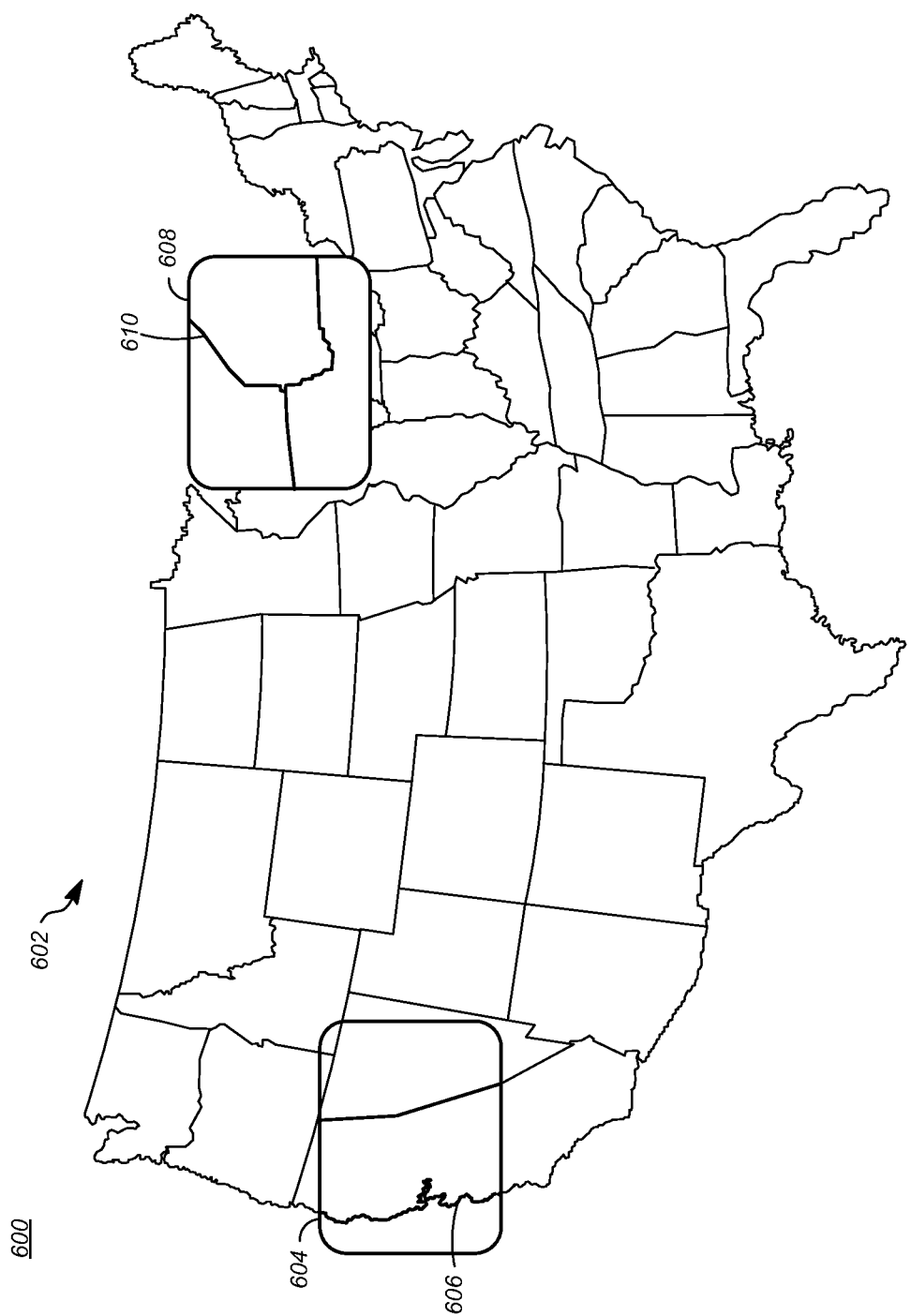
FIG. 6 is a diagram of a multi-screen application according to another embodiment showing a mapping application.

FIG. 6 is a diagram of a multi-screen application 600 according to another embodiment showing a mapping application. Multi-screen application 600 includes a virtual map 602 and a first computing device 604 that displays a first portion 606 of map 602 on its display screen. A second computing device 608 displays a second portion 610 of map 602 on its display screen. In this case, second computing device 608 has "zoomed" second portion 610 of map 602 to display more detail in second portion 610 of the 602. The resolution and scale of the first and second computing devices 604, 608 can be set separately even though the underlying database, in this case map 602, is the same. As in the embodiment of FIG. 5, first computing device 604 can be arranged in a relationship with second computing device 608 in a manner such as shown in FIG. 2.

Figure 7:
FIG. 7 is a diagram of a multi-screen application according to an embodiment showing a gaming application.

FIG. 7 is a diagram of a multi-screen application 700 according to an embodiment showing a gaming application. In this example, two or more computing devices can be used as both displays and controllers for a video game, in contrast to video game controllers, where the screen and motion sensing devices are separate. For example, two tablet or other computing devices can be used to play a virtual game of flying disc. In an implementation, the players view the screens of computing devices that display images related to the person throwing the flying disc and to the person catching the flying disc.

Multi-screen application 700 is a computer game that includes a first computing device 702, which can be a tablet or other computing device having a structure similar to that shown in FIG. 1. A display screen of first computing device 702, such as display 28, has an image of a flying disc 704. By manipulating the display using, for example, a touch-screen interface, a user can "aim" flying disc 704 in a direction and "toss" flying disc 704. The user attempts to toss flying disc 704 with appropriate force and direction to hit a target hand 708 displayed on a second computing device 706. For example, the force can be determined by the length and speed of a finger swipe on the touch screen and the direction by the direction of the finger swipe. The correct direction and force can be determined by the relative locations and attitudes of first and second computing devices 702, 706, e.g., as second computing device 706 is moved further from first computing device 702, flying disc 704 will have to be tossed with more force to reach target hand 708. Second computing device 706 can display an animated scene of flying disc 704 coming towards second computing device 706 on its display screen, for example, to permit second computing device 706 to be moved appropriately to "catch" flying disc 704. First computing device 704 can be arranged in a relationship with second computing device 706 in a manner such as shown in FIG. 7.

Figure 8:
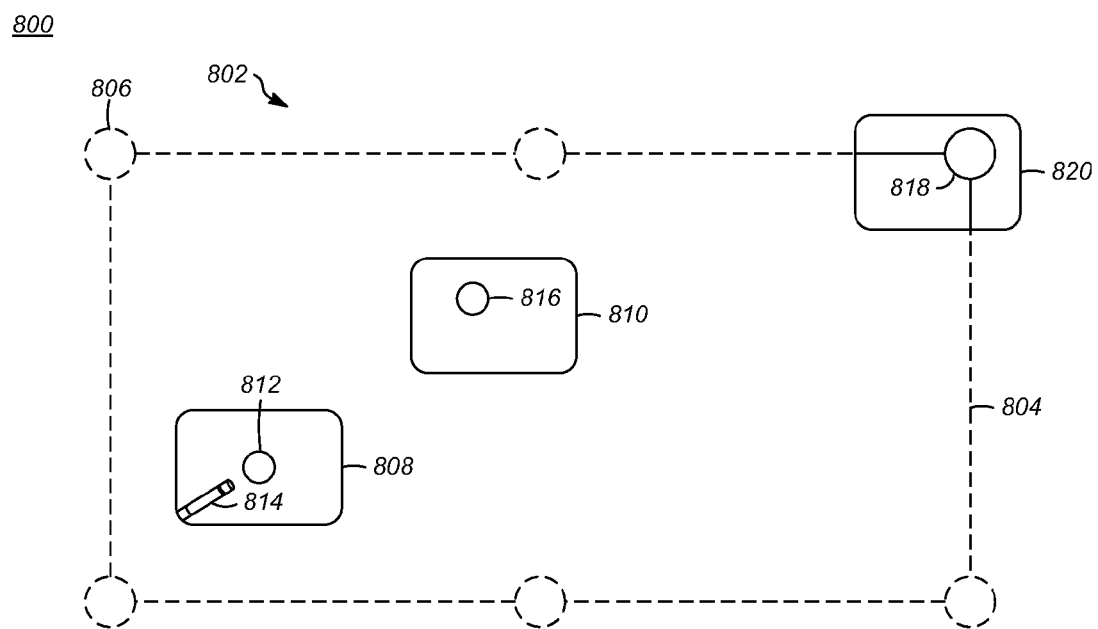
FIG. 8 is a diagram of a multi-screen application according to another embodiment showing a gaming application.

FIG. 8 is a diagram of a multi-screen application 800 according to another embodiment showing a gaming application. Multi-screen application 800 is a computer game that includes a first computing device 808, a second computing device 810 and a third computing device 820. Each of first computing device 808, second computing device 810 and third computing device 820 can have a structure similar to that shown in FIG. 1 and can be connected together by a network such as network 210 in FIG. 2.

A software program executing on first computing device 808 includes a virtual image of a pocket billiards table 802 having bumpers 804 and pockets 806. First computing device 808 displays a portion of table 802 that includes a cue ball 812 on its display screen. Second computing device 810 displays a portion of table 802 including an object ball 816 on its display screen. Third computing device 820 displays a portion of table 802 including a pocket 818 on its display screen. A user can manipulate an image of a cue stick 814 by, for example, touching a touch screen of first computing device 808. The force and direction with which the user interacts with the touch screen user interface can cause cue stick 814 to move to strike cue ball 812 on the display screen and will determine how object ball 816 is "struck" on the display screen of second computing device 810 and subsequently how object ball 816 will move into view of third computing device 820 in an attempt to sink object ball 816 in pocket 818. One or more of the computing devices 808, 810 and 820 includes software programs that calculate the physics of interaction between cue stick 814, cue ball 812, object ball 816, surface of table 802, bumpers 804 and pockets 806, 818 to simulate the pool game.

Figure 9:
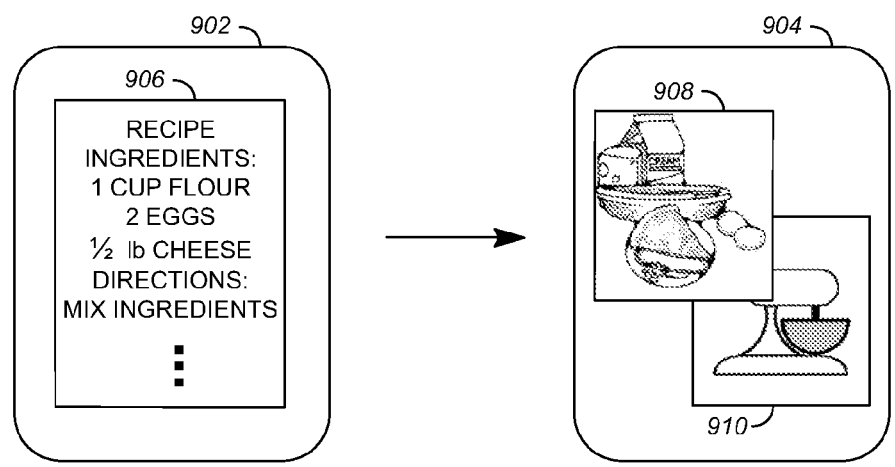
FIG. 9 is a diagram of a multi-screen application according to another embodiment showing a text-based application with related images.

FIG. 9 is a diagram a multi-screen application 900 according to another embodiment, showing a text-based application 906 with accompanying images 908, 910. Multi-screen application 900 shows a text-based application 906, executing on a first computing device 902 which can be a computing device similar to computing device 16. In this example, the text-based application 906 can be a cooking recipe. A second computing device 904, which can be a computing device similar to computing device 16 is in wireless communication the first computing device 902 using a network 210, for example. As the text in the text-based application 906 is displayed, a current location in the text file can be indicated by, for example, scrolling through the text file or touching a touch-sensitive screen.

The first computing device 902 can send information wirelessly, for example, to the second computing device to indicate a current position in the text file. The second computing device can display a first image 908 that complements or illustrates the text found at a current position in a text-based application 906 on first computing device 902. When the text-based application 906 indicates that the current position has changed, the first computing device 902 can communicate this information to a second computing device 904, wherein the second computing device can display or bring into the foreground a second image 910 that complements or illustrates the text found at a new position in the text-based application 906. The data displayed on the second computing device 904 can change when, for example, the first computing device 902 indicates that an image not currently displayed on the second computing device 904 is linked to the portion of the text file currently being accessed.

In the example shown in FIG. 9, a text based application 906 in a multi-screen application 900 includes a cooking recipe. As a user accesses the steps of the recipe by scrolling the text file or touching a touch screen, for example, information regarding which step in the recipe is communicated from a first computing device 902 to a second computing device 904. The second computing device can display a first image 908 illustrating ingredients and then display a second image 910 illustrating mixing the ingredients, for example, as the user navigates through the recipe on the first computing device 902.

This example of a multi-screen application 900 is not limited to coordinating text-based applications with image data. Any type of navigable data can be displayed and manipulated on a first computing device 902, from, for example, spreadsheets, databases or presentations. The second computing device 904 can display any type of accompanying data, for example text, videos or audio data, that can be linked to the data being displayed or accessed on the first computing device 902. The data sets on the two computing devices 902, 904 can be loosely linked, meaning that the data displayed on the second computing device 904 can also be accessed and manipulated independently from the first computing device 902 if desired.

In embodiments of multi-screen applications, one computing device, a tablet computer, for example, can perform the role of master while one or more additional computing devices can be marked as servers. For example, in a simple two-screen configuration, two tablet computers can be arranged side-by-side along their long edges. A software program executing on one of the computing devices can implement an application program interface (API) as follows:

1) One or more server computing devices will disclose their existence on a network connecting the multiple computing devices, such as network 210 in FIG. 2, by sending broadcast signals or listening to a specific port.

2) A master computing device will scan the network to find server computing device(s), either by listening to broadcast signals on the network or by sending a broadcast signal and waiting for an answer.

3) Once connected, the master computing device can push events to the server computing device(s).

4) Each server computing device can send touch events or other events/signals (e.g., accelerometer or proximity sensor signals) back to the master computing device.

In one disclosed embodiment, the master computing device can send compressed video update messages to the server computing device(s), specifying what regions of the screens must be redrawn according to application events. Users can interact with any of the computing devices. Each server computing device can send touch or other events back to the master computing device, which will render the updated user experience on screens of the master and server computing devices via the API. For example, a map application can span multiple screens. When the map is dragged around on any one of the screens, all screens can be updated accordingly. When one computing device is moved with respect to another after the initial connection, the software program can determine the relative position of the computing devices and update the displays accordingly.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Other implementations of computing device system 200 are possible. For example, one implementation can omit the network 210. In another implementation, additional components can be added to computing device system 200. For example, a server with or without a display and/or an additional computing device can be added. Each computing device may also include a speaker in addition to sound-sensing device 40.

The embodiments of the computing devices, such as computing device 16, (and the algorithms, methods, instructions, etc., stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of the computing devices do not necessarily have to be implemented in the same manner.

In one embodiment, the computing devices can be implemented using general purpose computers/processors with a computer program that, when executed, carries out any of the respective methods, algorithms and/or instructions described herein. In addition or alternatively, for example, special purpose computers/processors can be utilized that can contain other hardware for carrying out any of the methods, algorithms, or instructions described herein.

Further, all or a portion of embodiments of the present disclosure can take the form of a computer program product accessible from, for example, a non-transitory computer-usable or computer-readable medium. A non-transitory computer-usable or computer-readable medium can be any device that can, for example, tangibly contain, store, communicate, or transport the program for use by or in connection with any processor. The non-transitory medium can be, for example, an electronic, magnetic, optical, electromagnetic, or a semiconductor device. Other suitable mediums are also available.

While this disclosure includes certain embodiments, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method, comprising:
    determining, by a first computing device, location data corresponding to a physical location of the first computing device;
    outputting, by the first computing device, for display on a display screen associated with the first computing device, a first portion of display data associated with a first application executing on the first computing device;
    transmitting, by the first computing device, to a second computing device, an instruction to output, for display on a display screen associated with the second computing device, a second portion of the display data associated with the first application executing on the first computing device, the second portion of the display data being selected based on location data indicating the physical location of the second computing device relative to the physical location of the first computing device, the second portion of the display data being different from the first portion of the display data;
    responsive to a change in the physical location of the second computing device relative to the physical location of the first computing device, updating, by the second computing device, the location data indicating the physical location of the second computing device relative to the physical location of the first computing device; and
    changing, by the second computing device, based on the updated location data, the second portion of the display data that is output for display on the display screen associated with the second computing device.

2. The method of claim 1, further comprising:
    defining, by the second computing device, an initial location of the second computing device relative to the first computing device while the first computing device and second computing device are in a defined physical relationship, and wherein the second portion of the display data is selected based on the location data indicating the physical location of the second computing device relative to the physical location of the first computing device and the initial location.

3. The method of claim 2, wherein defining the initial location comprises:
    outputting, by the first computing device, for display on the display screen associated with the second computing device, a user interface, the user interface indicating that the first computing device and second computing device are in the defined physical relationship; and
    responsive to receiving, at the second computing device, an indication of a user input indicating that the first computing device and second computing device are in the defined physical relationship, defining the initial location based on the defined physical relationship.

4. The method of claim 2, wherein the initial location is defined in response to the first computing device detecting a physical contact with the second computing device.

5. The method of claim 2, further comprising:
    sensing, by a location-sensing device associated with the second computing device, the physical location of the second computing device, wherein the location data indicating the physical location of the second computing device relative to the physical location of the first computing device is generated based on the initial location and the sensed physical location.

6. The method of claim 1, further comprising:
    receiving, at the first computing device, from the second computing device, the location data indicating the physical location of the second computing device relative to the physical location of the first computing device; and
    wherein outputting, for display, the first portion of the display data comprises:
        outputting, by the first computing device, for display on the display screen associated with the first computing device, the first portion of the display data based at least in part on the location data received at the first computing device.

7. The method of claim 1, further comprising:
    changing, by the first computing device, the first portion of the display data that is output for display on the display screen associated with the first computing device;
    updating, by one or more of the first computing device and second computing device, the changed first portion of the display data while executing the first application on the first computing device to produce updated data for the second computing device; and
    transmitting, by the first computing device, the updated display data to the second computing device.

8. The method of claim 7, further comprising:
    determining whether at least a portion of the changed display data that is output for display on the display screen associated with the first computing device is associated with data to be displayed on the display screen of the second computing device;
    determining whether the data to be output for display on the display screen associated with the second computing device is currently being output for display; and updating the display screen associated with the second computing device to display the data to be output for display.

9. The method of claim 7, further comprising:
updating, by the second computing device, the display screen associated with the second computing device based on the updated display data and the location data indicating the physical location of the second computing device relative to the physical location of the first computing device.

10. An apparatus, comprising:
a first computing device including:
a first memory; and
a processor configured to execute instructions stored in the memory to cause the first computing device to:
execute a first application; and
output, for display on a first display screen, a first portion of display data associated with the first application executing on the first computing device; and
a second computing device including:
a memory; and
a processor configured to execute instructions stored in the memory to cause the second computing device to:
receive, from the first computing device, an instruction to output, for display on a second display screen, a second portion of the display data associated with the first application executing on the first computing device, the second portion of the display data being selected based on location data indicating the physical location of the second computing device relative to the physical location of the first computing device, the second portion of the display data being different from the first portion of the display data;
output, for display on the second display screen, the second portion of the display data;
responsive to a change in the physical location of the second computing device relative to first computing device, update the location data indicating the physical location of the second computing device relative to the physical location of the first computing device; and
change, based on the updated location data, the second portion of the display data that is output for display on the second display screen.

11. The apparatus of claim 10, wherein the second computing device is a mobile computing device.

12. The apparatus of claim 10, further comprising:
a network connecting the first computing device and second computing device for communication therebetween.

13. The apparatus of claim 10, wherein the second display screen is a touch screen configured to receive user input, and wherein the processor of the second computing device is configured to determine the location data indicating the physical location of the second computing device relative to the physical location of the first computing device by:
outputting, for display on the second display screen a user interface, the user interface indicating that the first computing device and second computing device are in a defined physical relationship; and
responsive to receiving an indication of a user input indicating that the first computing device and second computing device are in the defined physical relationship, defining an initial location based on the defined physical relationship.

14. The apparatus of claim 13, wherein each of the first computing device and second computing device includes a respective location-sensing device, and wherein the processor of the first computing device is configured to determine the location data indicating the physical location of the second computing device relative to the physical location of the first computing device by:
generating the location data indicating the physical location of the second computing device relative to the physical location of the first computing device based on the physical location of the second computing device, as sensed by the location-sensing device of the second computing device, the physical location of the first computing device as sensed by the location-sensing device of the first computing device, and the initial location.

15. The apparatus of claim 10, wherein the second computing device includes a location-sensing device, and wherein the processor of the second computing device is configured to determine the location data indicating the physical location of the second computing device relative to the physical location of the first computing device by:
generating the location data indicating the location of the second computing device relative to the physical location of the first computing device based on the physical location of the second computing device as sensed by the location-sensing device of the second computing device, the physical location of the first computing device, transmitted to the second computing device from the first computing device, and an initial location of the second computing device relative to the first computing device.

16. The apparatus of claim 15, wherein the processor of the second computing device is configured to:
receive, from the first computing device, an instruction to update the second display screen based on the location data responsive to the first computing device or second computing device being moved relative to the other of the first computing device or second computing device.

17. The apparatus of claim 10, wherein the processor of the second computing device is configured to:
update the location data indicating the physical location of the second computing device based on at least one of a change in physical location of the first computing device from a respective initial position and a change in physical location of the second computing device from a respective initial position; and
change the second portion of the display data that is output for display on the second display screen based on the updated location data.

18. The apparatus of claim 10, wherein the first display screen is a touch screen configured to receive user input,
wherein the processor of the first computing device is configured to change data that is output for display on the first display screen responsive to receiving an indication of user input being received and transmit an indication of the change to the second computing device, and
wherein the processor of the second computing device is configured to update the second portion of the display data that is output for display on the second display screen based on the change and the location data.

19. The apparatus of claim 18, wherein the apparatus is configured to:
determine whether at least a portion of the changed data that is output for display on the first display screen is associated with data to be output for display on the second display screen;

determine whether the data to be output for display on the second display screen is currently being output for display; and updating the second display screen to display the data to be output for display.

20. A non-transitory computer readable media storing instructions that, when executed by a processor, cause a computing device to:

determine location data corresponding to a physical location of a first computing device;

output, for display on a display screen associated with the first computing device, a first portion of display data associated with a first application executing on the first computing device;

transmit, to a second computing device, instructions to output, for display on a display screen associated with the second computing device, a second portion of the display data associated with the first application executing on the first computing device, the second portion of the display data being selected from the display data based on location data indicating the physical location of the second computing device relative to the physical location of the first computing device, the second portion of the display data being different from the first portion of the display data;

responsive to a change in the physical location of the second computing device relative to the first computing device, update the location data indicating the physical location of the second computing device relative to the physical location of the first computing device; and change, based on the updated location data, the second portion of the display data that is output for display on the display screen associated with the second computing device.

21. The non-transitory computer readable media of claim 20, wherein the instructions, when executed by the processor, further cause the computing device to:

initialize the location data indicating the physical location of the first computing device by initializing the physical location of the second computing device relative to the physical location of the first computing device;

receive an indication of the physical location of the second computing device; and determine the location data indicating the physical location of the second computing device to the initialized location data.

* * * * *